Aug. 20, 1957     E. M. HYDE     2,803,420
PLASTIC ARTICLE AND ATTACHING MEANS THEREFOR
Filed April 15, 1955
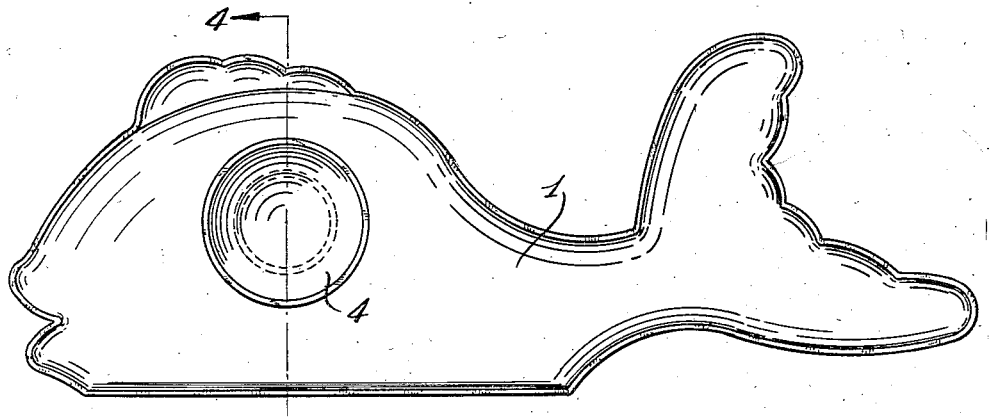
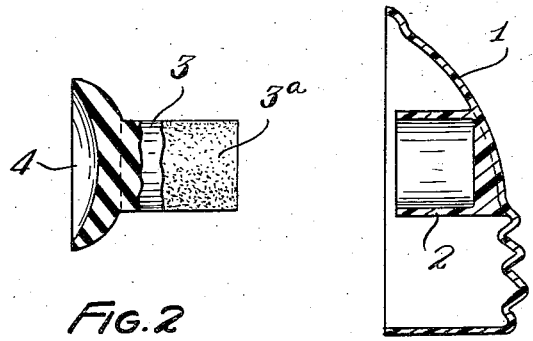 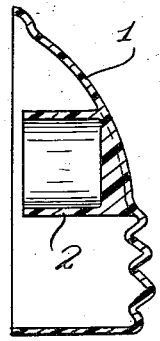
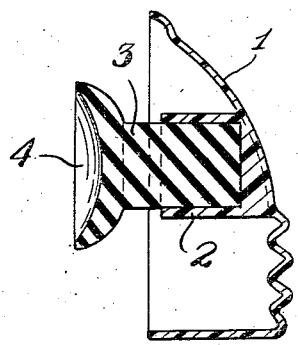
INVENTOR.
EDWARD M. HYDE
BY
*Milburn & Milburn*
ATTORNEYS

United States Patent Office 2,803,420
Patented Aug. 20, 1957

2,803,420

PLASTIC ARTICLE AND ATTACHING MEANS THEREFOR

Edward M. Hyde, Sharon, Pa.

Application April 15, 1955, Serial No. 501,676

1 Claim. (Cl. 248—206)

This invention is for a combination of a plastic article and an improved means for supporting the same so that it may be readily and removably mounted upon various surfaces.

As is of course well known, the use of nails in mounting articles upon a tile wall, as for instance in the bath room of a home, is not at all practical; and of course the same thing is true in connection with large mirrors that often cover portions of the walls in stores and elsewhere, as well as glass partitions, windows and the like. At the same time, the appearance of such a large surface area would often be greatly improved by one or more decorative objects provided that they could be readily applied thereto and removed therefrom, as may be desired, without marring the surface to which applied.

It is therefore the object of my present invention to devise a convenient and efficient means for removably attaching a plastic article to a wall, mirror, glass window or partition, or the like without marring the same.

Other objects will appear from the following description and claims when considered together with the accompanying drawing.

Fig. 1 illustrates one embodiment of my present invention in rear elevation;

Fig. 2 illustrates a rubber suction cup with an adhesive applied to the shank portion thereof;

Fig. 3 is a sectional view through the present form of device and illustrates the integral projection with the recess to receive the shank of the rubber suction cup; and Fig. 4 is a sectional view taken on line 4—4 of Fig. 1.

It is to be understood that the present form of disclosure is merely for the purpose of illustration and that there might be various modifications thereof without departing from the spirit of my invention as herein set forth and claimed.

In the accompanying drawing I have illustrated a one-piece molded plastic body of a decorative character which, in the present case, may be of hollow form and may have an integral hollow projection 2 extending rearwardly from the inner or rear side thereof. The inner surface of this hollow projection 2 may be of cylindrical form adapted to receive in a snug manner the integral correspondingly formed shank portion 3 of the rubber suction cup 4. A suitable adhesive 3a, as for instance cement, may be applied to the shank portion 3 for securing the same within the recess of the hollow projection 2. This suction cup 4 will serve as a ready and efficient means for removably attaching the plastic object 1 to the surface desired, as for instance a wall, mirror, glass window or the like. The suction cup may be caused to adhere to such wall or the like by moistening the inner surface of the cup and then pressing the same against the surface to which it is to be applied, such manner of attachment of a suction cup being of course well known. Or, if so desired, a light form of adhesive may be employed although this may not be necessary especially in case it might be desirable to remove the object and to change its position or to substitute another object from time to time.

My present invention is especially adapted for application of decorative plastic figures to the wall or other surface for the purpose of breaking the monotony of such an extensive area and to add to the artistic appearance of the same. Also, this same invention may be employed for mounting advertising media or various articles of utility in various combinations and arrangements upon such a surface; and, in each and every instance, the article may be readily applied to and as readily removed from the surface at any time it may be desired to change the position of the article or to substitute another one therefor.

Thus the capabilities of the present invention are thought to have a strong appeal from the standpoints of wall decoration, advertising and utility, especially because of the ease with which such an object may be mounted and removed without marring the wall or other surface. Also, this invention is of a simple nature and may therefore be embodied in various forms at such low cost as to ensure its popularity in the home and elsewhere.

What I claim is:

In combination, a plastic body having an integral projection that is located entirely upon the rear thereof and that has a rearwardly opening recess of substantial depth therein, said body forming a closed wall for the bottom of said recess, said recess having a plain inner surface normal to the bottom thereof, and a suction cup of elastic composition with an integral shank of substantially the same cross section and form and size as the interior of said recess and secured therewithin so as to provide a means of readily removable attachment for said plastic body.

References Cited in the file of this patent

UNITED STATES PATENTS

| 948,113 | Moore | Feb. 1, 1910 |
| 1,518,943 | Story | Dec. 9, 1924 |
| 1,934,653 | Arthur | Nov. 7, 1933 |